United States Patent
Carmichael et al.

(10) Patent No.: US 7,124,022 B2
(45) Date of Patent: Oct. 17, 2006

(54) FEATURE MAPPING BETWEEN DATA SETS

(75) Inventors: Douglas Rayner Carmichael, Weymouth (GB); Sean Alaric Chapman, Weymouth (GB)

(73) Assignee: QinetiQ Limited, (GB)

( * ) Notice: Subject to any disclaimer, the term of this patent is extended or adjusted under 35 U.S.C. 154(b) by 67 days.

(21) Appl. No.: 10/516,263

(22) PCT Filed: May 28, 2003

(86) PCT No.: PCT/GB03/02329

§ 371 (c)(1),
(2), (4) Date: Nov. 29, 2004

(87) PCT Pub. No.: WO03/102870

PCT Pub. Date: Dec. 11, 2003

(65) Prior Publication Data

US 2006/0123050 A1    Jun. 8, 2006

(30) Foreign Application Priority Data

May 31, 2002 (GB) .................................. 0212748.8

(51) Int. Cl.
*G01C 21/30* (2006.01)
(52) U.S. Cl. .................. 701/208; 701/200; 701/201; 701/207; 340/995.14; 340/995.15; 342/357.01; 342/357.07
(58) Field of Classification Search .............. 701/200, 701/201, 208; 340/995.14, 995.15; 342/357.01, 342/357.07
See application file for complete search history.

(56) References Cited

U.S. PATENT DOCUMENTS

| 4,628,453 A |   | 12/1986 | Kamejima et al. |
| 4,891,762 A |   | 1/1990  | Chotiros |
| 4,908,874 A | * | 3/1990  | Gabriel ..................... 382/277 |
| 4,951,040 A | * | 8/1990  | McNeil et al. ............. 345/427 |
| 5,087,916 A |   | 2/1992  | Metzdorff et al. |
| 5,303,795 A | * | 4/1994  | Buell .......................... 180/219 |
| 5,748,192 A | * | 5/1998  | Lindholm ................... 345/649 |

FOREIGN PATENT DOCUMENTS

| WO | WO 99/67660 | 12/1999 |
| WO | WO 01/78007 | 10/2001 |

OTHER PUBLICATIONS

Ton, et al. "Registering Landsat Images by Point Matching", IEEE Transactions on Geoscience and Remote Sensing pp. 642-651 (1989).

Brown, "A Survey of Image Registration Techniques", ACM Computing Surveys, pp. 325-376 (1992).

* cited by examiner

*Primary Examiner*—Gertrude A. Jeanglaude
(74) *Attorney, Agent, or Firm*—McDonnell Boehnen Hulbert & Berghoff LLP

(57) ABSTRACT

The present invention relates to data mapping and involves the mapping of at least one feature from one data set to a corresponding feature in a second data set. Individual points of the features are initially mapped and an transformation for mapping the entire feature is derived from the individual mappings. The feature mapping may be used to enhance vehicle navigation, in feature tracking algorithms, and in image processing systems.

34 Claims, 2 Drawing Sheets

FEATURE MAPPING BETWEEN DATA SETS

The present invention relates to data mapping, and more particularly to methods of deriving a transformation which maps features of a first data set onto corresponding features in a second data set.

In the context of the present invention, a data set may particularly be any two-dimensional array of features, such as, for example, a photographic image or a bathymetric contour map of a region of a sea-floor obtained from sonar measurements. It will be recognised that a feature need not be a topographical or physical entity. Thus, a feature could be any distinctive or characteristic entity, whether real or abstract.

The derivation of transformations required to map features between data sets is an important function in many diverse applications. In the field of vehicle navigation, sets of data captured by sensors of various kinds (e.g. sonar, radar or photographic sensors) may be processed to give information on vehicle position, speed and bearing derived from knowledge of the transformation needed to map one data set onto another. The matching of data sets by deriving such a transformation is also required in the generation of panoramic scenes from a series of individual scenes taken, for example, by camera or camcorder, and to establish the exact position of items in crash or crime scenes from a series of individual photographic images. Such matching of data sets, particularly photographic images, is also required in various aspects of pipeline inspection, such as weld monitoring and corrosion monitoring. Two further instances where knowledge of transformations for mapping between data sets is useful are data compression (for example general video compression of linear motion scenes or telemedicine applications), and data retrieval/archiving from paper trace records.

The analysis of information is an area of increasing importance. As processing power becomes less expensive and faster, there is a desire amongst developers to seek to handle ever larger data sets. This is particularly true in those areas of technology that have resulted from the explosion in digitisation capability. Examples of such technology include manipulation of video imagery, and scanned imagery. It is also the case that the development of advanced mapping and navigation techniques is extremely reliant on the ever more detailed and therefore larger data sets. Unfortunately, although the processing and indeed storage capability now exists to handle such large data sets both relatively efficiently and inexpensively, this is not the case when it comes to the analysis of the data sets. Techniques for analysing such data lag far behind the ability to produce it. By information analysis is to be understood the ability to manage and integrate information, as well as the extraction techniques for various types of important, anomalous, interesting, or unexpected features from data sets. It will be understood that data sets may exist in various forms and will be obtained from various sources. For example, data sets may be held as an image or suchlike on storage in the form of a file on a database. Such storage may, of course be distributed, as indeed may the file itself. In addition, data sets may be generated from information obtained in real time. It is clearly also the case that the data set may to a greater or lesser extent suffer from noise, omission or error.

Accordingly, one aspect of the present invention provides a method of deriving a feature tracking transformation which is computationally more efficient than prior art methods, and which may therefore be executed more quickly and/or with reduced computer hardware requirements than is the case for prior art methods.

As has been indicated, mapping between data sets has particular relevance in a wide range of applications. Examples of such applications include, but are not limited to, modelling, simulation, navigation, data compression and imaging.

According to a first aspect of the present invention there is provided a method of deriving a feature mapping transformation to map at least one feature from a first data set onto a corresponding feature from a second data set, comprising the following steps: (a) extracting a first set of points relating to said at least one feature in said first data set; (b) associating said first set of points with a second set of points in said second data set; (c) calculating said feature tracking transformation to at least approximately map said first set of points from said first data set to said second set of points in said second data set, wherein said step of calculating said feature tracking transformation comprises the steps of: (i) for each point in one of said two sets of points, estimating a mapping of said point to a selected point in said other set of points to produce individual point mapping estimates; (ii) combining said individual point mapping estimates to produce an estimated transformation to map said one set of points to said other set of points; (iii) applying said estimated transformation to said one set of points to generate an approximate image position; (iv) repeating said steps (i) to (iii) iteratively to produce an estimated transformation for mapping said other set of points to a set of points from said approximate image position; and (v) deriving said feature tracking transformation for mapping said first set of points to said second set of points from a combination of said estimated transformations.

An embodiment of the invention involves its application to non-traditional navigation involving feature tracking and/or data set matching between data sets in an underwater environment. A problem with feature mapping between data sets, particularly where the accuracy of one of the data sets may not be high is that the noise between the two systems can be such that it may be difficult to find exactly which points relate to a particular feature in one data set and which points they correspond to in the other. Thus, calculating a mapping between the two data sets can be difficult.

In practice noise between the data sets and the fact that a feature from one data set may not contain the same number of points as a corresponding feature in the other data set makes the mapping of features between data sets difficult to calculate. An iterative method which deals with individual point mappings first and combines the results is a particularly effective way of dealing with the situation. In particular, mapping individual points to produce an approximate image and then mapping in the other direction means that any points that are mismatched, i.e. they are not mapped to the correct corresponding point in the other data set in one iteration, may be correctly mapped in subsequent iterative mapping steps such that this error may correct itself. Furthermore, the iterative method of calculating the mapping of a feature between data sets, is a relatively low cost one which does not require a large amount of computer processing power. Additionally, by estimating the mapping of individual points from a first set of points to a second set of points and then doing the operation from the second set of points back towards the first set of points symmetry of the system is preserved and this prevents or at least reduces the possibility of convergence to false minima.

In preferred embodiments, the method comprises the further steps of: iteratively repeating steps (i) to (iii) using said latest approximate image position and alternative first and second sets of points until said approximate image position aligns with said second set of points to within predetermined limits and deriving said feature tracking transformation from a combination of said estimated transformations.

As with all iterative methods, the amount of computing power required depends on the number of iterative steps performed which relates to the accuracy of the result. The predetermined limits can thus be set according to the desired accuracy and the amount of computing power available.

Although the required accuracy can be specified in a number of ways, a preferred way is to stop the iteration when applying said estimated transformation to said approximate image produces no movement of said approximate image.

Although in step (i) the points in the other data set can be selected in a variety of ways, preferably the other points are selected on a nearest neighbour basis by mapping each point in said one set of points to its nearest spatial neighbour in said other set of points. This is a particularly efficient way of mapping points, once a first point at a given radius has been found any points further away than this radius can be eliminated, and so on with the next tested point. Thus, the technique is computationally very efficient.

Preferably step (i) of estimating the mapping of individual points is done using an optimal assignment algorithm.

In preferred embodiments said step of estimating the mapping of individual points includes a deletion step during which any points from said data sets that are mapped over a distance that is greater than a specified distance are deleted from the set of points. This allows points that are much further away from their corresponding point in the other data set to be deleted from the set of points and as such reduces errors from points that are not part of the same feature or that are due to noise.

Although the specified distance can be chosen in a number of ways in preferred embodiments said specified distance comprises a multiple number of times the median of the squared distance distribution of the distances between individual points in one set of points and their nearest neighbour in the other set of points.

In some embodiments, the step of deriving a transformation for mapping said first data set to said second data set comprises summing said mapping of said estimated transformations. In the embodiment where the transformation comprises a translation and a rotation the different translations and rotations are summed to produce a resultant translation and rotation. With this method both sets of data are given equal weight. In other embodiments, however a first set of data may be known to a greater accuracy than a second set of data, in this case the estimated transformations can be weighted before they are combined to reflect these different degrees of accuracy. In other embodiments where the transformations cannot be summed, they may be combined in a different way.

Although the first set of points can be extracted in a variety of ways such as by detecting corners or brightness transitions, in preferred embodiments the step of extracting said first set of points comprises using an edge detection algorithm to extract said points from said first data set. An edge detection algorithm can be used to identify the edge of some feature and a set of points can then be extracted from this edge, it is particularly effective with video data.

Although the features used can be a variety of things such as lines from edge detectors, in an embodiment relating to underwater navigation the features relate to bathymetric contours. Equally, the features may relate to contours derived from topographic images or edge detection in video imagery.

Although the estimated transformation and the feature tracking transformation can comprise different things such as a homographic transformation in preferred embodiments they comprise affine transformations comprising a translation and a rotation of the sets of data points. Affine transformation is an effective way of mapping one set of data points onto another set of data points spatially.

Preferably, said step of using the estimate of the mapping of individual points to derive an estimated transformation to map said first set of points to said second set of points comprises combining the individual mappings using the method of least squares or iterative re-weighted least squares, and estimating said parameters of an affine transformation therefrom. This is a convenient, accurate and cost-effective way of combining the individual mappings to provide an estimated transformation Preferably, said first set of points comprises over one hundred points. The use of a large number of points relating to a feature means that good feature mapping is not required, as it is not too important if one point maps to a point that does not correspond to the same position on that feature. Furthermore, the use of an iterative mapping technique means that some points that are initially mapped to non-matching points may on a further iteration be mapped to their correct counterpart.

In preferred embodiments sets of vectors having a position and a direction are extracted, associated and mapped rather than sets of points, a constraint being added to said method such that only vectors having similar directional components are mapped onto each other.

It has been found that if vectors rather than points are used, then when the individual components of the data sets are matched the additional constraint of direction reduces the number of mis-matchings making the method more robust and reducing the likelihood of false convergence. Examples of vectors that can be used are contours with both a value and a direction indicating an increase in contour value or an edge with a direction indicating a light to dark transition.

The magnitude of the directional constraint applied depends on the situation. If too low a degree of rotation is applied then the algorithm cannot recover images that have been rotated to some higher degree. However, given that the tracking algorithm of embodiments of the present invention is particularly applicable to small movement tracking then a fairly low degree of rotational constraint has been found to be appropriate in many cases. It has been found to be particularly effective to only allow vectors from said first data set to mapped onto vectors from said second data set that have a directional component within +/−90° of said first data set vector. Such a directional constraint has been found to reduce mis-matchings without overly complicating the matching procedure.

A second aspect of the present invention provides a method of deriving a data set transformation for mapping a first data set onto a second data set, comprising a method according to a first aspect of the present invention; and the further step of outputting said feature tracking transformation as a data set transformation for mapping said first data set to said second data set. The mapping of one feature within one data set to a position in a second data set is indicative of how the first data set maps to the second data set and as such the transformation derived to map the feature can be used as a transformation to map the whole data set if this is required.

In some embodiments the method comprises a further step of extracting at least one further set of points or vectors relating to at least one further feature from said first data set; associating said at least one further set of points or vectors with a second further set of points or vectors in a second data set; calculating at least one further feature tracking transformation to at least approximately map said at least one further first set of points or vectors from said first data set to said further second set of points or vectors from said second data set, by using steps (i) to (v) of a first aspect of the present invention; combining said at least one feature tracking transformation and said further feature tracking transformation to produce a data set transformation; and outputting said data set transformation.

The mapping of two features from a first data set to a second data set has several advantages. In the first place the actual mapping relates to two sets of points thus there a greater number of points and yet each set of points can be associated with its own set, so that the number of points that can be mapped to is not increased. The technique is therefore more robust as there is more data and also more constraints on to where this data can map to. In order for this to work two features that are easily separable are needed.

As has been indicated above, the invention is applicable to a wide range of technology. Thus, although the particular embodiments set out below relate to the challenging environment of underwater navigation, it will be well understood by those skilled in the art that the invention is not intended to be limited to application in this field.

By way of background, There is a desire to use autonomous underwater vehicles (AUVs) and unmanned underwater vehicles (UUVs) to support future mine countermeasures (MCM) operations. Current systems offer only a limited level of performance in terms of their capability to navigate, communicate and operate autonomously.

AUV systems are generally designed for MCM reconnaissance tasks (mine countermeasures), operating autonomously, whilst UUVs are generally used for mine disposal and intervention tasks and therefore operate over relatively short ranges. They can however be used in commercial applications such as in oil exploration.

The objectives of MCM are to assess and reduce the threat posed by mining. Threat assessment activities including reconnaissance and exploratory operations that inform the Command of the presence or absence of mines and permit optimal planning of subsequent MCM and Task Force operations. If mines or minefields are detected during threat assessment, their locations must be reported in a timely fashion and within a stated accuracy so that the mines can be avoided by a safe distance and can be relocated rapidly for clearance to take place. Although currently performed overtly there is a desire to perform MCM operations covertly i.e. without opposition forces (OPFOR) knowledge. This implies that the operation should be performed with a small chance of detection. Obviously once launched, the chance of an AUV remaining undetected are increased if it remains subsurface for the duration of the operation, although the OPFOR may have sub-sea acoustic detection techniques. The vehicle should also be capable of submerged operations for extended periods of time in order to provide a stable platform for search sonars at the optimum depth/height above the seabed.

Unlike AUVs which can undertake both long and short duration missions, UUVs generally undertake short duration missions, operating at ranges of up to 600 m from the host platform. A practical example of UUV use is a one-shot disposal vehicle mission.

The prime requirement for a UUV system is to move to the position of a target, in order to effect either a disposal or intervention operation. The navigation system is therefore required to operate over short distances and be capable of guiding the vehicle to a previously detected target.

Due to the likely error in detected target position the navigation system must also provide sufficient resolution to enable the movement of the vehicle whilst searching for the target to be mapped and thus the area of seabed searched to be identified. In this case the movement of the vehicle system relative to the start point of the search is probably more important than the absolute navigation accuracy.

The navigation performance must be greatest in higher clutter conditions where it is more likely that the vehicle sensors will be seduced by false targets. In good sonar environments where the seabed is completely flat the navigation needs of the UUV will be significantly reduced due to improved performance of the on-board vehicle sensors.

The primary requirement for a future disposal UUV will be to minimise the time taken to relocate and dispose of a target, rather than navigating accurately.

Current AUV navigation systems are based around the use of an INS (inertial navigation system). Inertial navigation is achieved by resolving inertial sensor outputs (derived from vehicle movement) into a Cartesian co-ordinate reference frame. After initialisation the INS enables estimates of vehicle position, velocity, attitude and heading to be calculated from inertial sensor outputs mounted within the vehicle. These systems are fairly accurate, but there is a need to surface for frequent global positioning system (GPS) fixes (a fix is required every 3 km for a navigation system costing in the region of £130 k) to correct for the inherent system drift. Maintaining target location performance at large sonar swath distances places an increased strain on system navigation capability requiring surfacing at even more frequent intervals. Improved navigation performance has traditionally been achieved by using increasingly expensive INS however at the higher levels of performance required by a future MCM system, even small levels of reduction in overall system drift can be very expensive to achieve.

In summary current traditional underwater navigation techniques, incorporating INS, Doppler velocity log (DVL) and depth sensor can meet AUV navigation needs, provided the AUV is able to surface at frequent intervals to obtain GPS. The ability to provide the AUV with sufficient performance to support accurate location of targets at the extreme target range of modern minehunting operations is difficult to achieve, requiring very frequent surfacing and the consequent loss/interruption of the reconnaissance data. Enhancing the performance of AUV navigation using traditional techniques requires the use of ever more expensive sensors, with significant expenditure being required to achieve even relatively modest increases in performance. Furthermore, the inclusion of specific navigation sensors reduces the volume available for power reducing overall system endurance.

Current MCM UUVs rely upon the use of ultra short baseline (USBL) or short baseline (SBL) acoustic navigation systems. Whilst these systems offer potentially suitable performance at ranges of 300 m, performance is unlikely to be maintained at 600 m and in practice the signal is so noisy that performing search and relocation tasks is often difficult and far from optimal.

In some embodiments bathymetric contours are used, one feature being a contour of a certain depth and a further feature being a contour of a different depth.

According to a third aspect of the present invention there is provided a method of enhanced navigation of a vehicle comprising deriving a data set transformation for mapping a first data set onto a second data set according to a second aspect of the present invention, wherein said first data set comprises stored map data of an area to be navigated through and said second data set comprises data detected by detectors on said vehicle during said navigation, said data set transformation being used to adjust navigation controls of said vehicle.

This method of deriving a transformation for mapping one data set to another is particularly effective in the field of enhanced navigation, wherein the correspondence between the two data sets can be used to help adjust the navigation of a vehicle. In some embodiments the first set of data is known data from say a map and the second set of data is data detected by the vehicle during the navigation. Alternatively, the first set of data may be data detected by detectors looking out the front of the vehicle and the second set of data may be a set of data corresponding to data detected by a vehicle's monitoring underneath the vehicle.

This method is particularly suited for unmanned underwater vehicles wherein the detectors are sonar detectors.

Although embodiments of the present invention could be used as the sole navigation system, particularly in feature rich environments, they are often used to improve the navigation from a conventional system such as an inertial movement sensor.

A fourth aspect of the present invention provides an image processing method for producing a map of an area from a plurality of images of said area produced by a sensor sensing said images as it moves relative to said area, said method comprising the following steps: deriving a data set transformation for mapping a first data set onto a second data set according to a second aspect of the present invention, wherein said first data set comprises an initial image of said area sensed by said sensor and said second data set comprises a subsequent image of said area sensed by said sensor after it has moved a certain distance; using said data set transformation to estimate said distance moved by said sensor relative to said area between images; combining said images using said estimated distance; and repeating said steps for subsequent images to produce a map of said area from said combined images.

The data set transformation of a second aspect of the present invention is particularly suited for image processing whereby a map of an area can be produced from a set of images taken, for example, by a moving sensor. This has application in such fields as pipeline mapping, whereby a vehicle takes a series of images of a pipeline as it moves alongside it. The image processing method can be used to combine these images to produce a map of said pipeline.

A fifth aspect of the present invention provides a feature tracking method for tracking a feature as it moves relative to a sensor comprising a method of deriving a feature tracking transformation to map at least one feature from a first data set onto a corresponding feature from a second data set according to a first aspect of the present invention, wherein said first data set comprises an image sensed by said sensor and said second data set comprises a subsequent image sensed by said sensor, deriving a distance and direction moved by said feature from said feature tracking transformation.

The method of the present invention is particularly suitable for feature tracking. This is because it works particularly well in situations where the two data sets are similar to each other such that the mappings performed are not over large distances. The system can be used in a variety of applications such as in tracking an object passing a sensor on a conveyor belt. It has been found to be particularly effective with noisy data sets, for example, where the imagery is poor perhaps due to poor lighting.

A sixth aspect of the present invention provides a computer program product operable to control a computer to map at least one feature from a first data set onto a corresponding feature from a second data set by controlling said computer to perform the steps of a method according to a first aspect of the present invention.

A seventh aspect of the present invention provides a computer program product operable to control a computer to derive a data set transformation for mapping a first data set onto a second data set by controlling said computer to perform the steps of a method according to a second aspect of the present invention.

A further aspect of the present invention provides a device for deriving a feature tracking transformation to map at least one feature from a first data set onto a corresponding feature from a second data set comprising: a signal processor operable to extract a first set of points relating to at least one feature from said first data set and to match said first set of point to a second set of points in a second data set; a calculating circuit operable to calculate a feature tracking transformation to at least approximately map said first set of points from said first data set to said second set of points in said second data set, wherein said calculating circuit is operable to perform the following iteration: for each point in one of said first or said second set of points, said circuit estimates a mapping of said point to a point in said other of said first or said second set of points; combines said individual point mapping estimates to produce an estimated transformation to map said one set of points to said other set of points; applies said estimated transformation to said one set of points to generate an approximate image position; repeats said iterative steps to produce an estimated transformation for mapping said other set of points to a set of points from said approximate image position; derives said feature tracking transformation for mapping said first set of points to said second points from a combination of said estimated transformations; said device further comprising an output device for outputting said feature tracking transformation.

A still further aspect of the present invention provides a navigation system for enhancing the navigation abilities of a vehicle comprising: storage means operable to store map data; at least one sensor for detecting said environment outside of said vehicle; and a signal processor comprising a computer program product according to a seventh aspect of the present invention operable to calculate a data set transformation operable to map a first data set comprising said map data stored in said storage means onto a second data set comprising image data sensed by said at least one sensor; and navigation control means operable to control the navigation of said vehicle, said navigation control means being operable to respond to said calculated data set transformation.

A further aspect of the present invention provides a navigation system for enhancing the navigation abilities of a vehicle comprising: storage means operable to store map data; at least one sensor for detecting said environment outside of said vehicle; and a signal processor comprising a computer program product according to a seventh aspect of the present invention operable to calculate a data set transformation operable to map a first data set comprising said map data stored in said storage means onto a second data set comprising image data sensed by said at least one sensor; and navigation control means operable to control the navigation of said vehicle, said navigation control means being operable to respond to said calculated data set transformation.

A yet further aspect of the present invention provides a navigation system for enhancing the navigation abilities of a vehicle comprising: storage means operable to store map data; at least one sensor for detecting said environment outside of said vehicle; and a signal processor comprising a computer program product according to a seventh aspect of the present invention operable to calculate a data set transformation operable to map a first data set comprising both stored map data and where map data is not available data previously detected by said sensors onto a second data set comprising image data currently sensed by said at least one sensor; and navigation control means operable to control the navigation of said vehicle, said navigation control means being operable to respond to said calculated data set transformation.

A further aspect of the present invention provides a navigation system for enhancing the navigation abilities of a vehicle comprising: storage means operable to store map data; a plurality of sensors for detecting said environment outside of said vehicle including an area in front of said vehicle and an area beneath said vehicle; and a signal processor comprising a computer program product according to a seventh aspect of the present invention operable to calculate a data set transformation operable to map a first data set comprising data sensed by said sensors monitoring an area in front of said vehicle onto a second data set comprising data sensed by said sensors monitoring an area beneath said vehicle; and navigation control means operable to control the navigation of said vehicle, said navigation control means being operable to respond to said calculated data set transformation.

Particular embodiments of the present invention will now be described by way of example only with reference to the accompanying drawings, of which.

Embodiments of the present invention are concerned with a scene based algorithm which may be used to support AUV navigation and aims to use information on features or contours, derived from forward look or bathymetric sonars respectively, to improve the positional accuracy of the vehicle. The overall concept covers two techniques, the employment of scene matching techniques (e.g. comparing the sonar information with similar information from a previous survey of the area) to estimate the true position of the vehicle and the tracking of the movement of features in a scene relative to that of the vehicle, thereby estimating the vehicle movement in areas where no pre-existing survey information is available. Although both methods have their respective application in charted and un-charted areas, we will consider the simpler former case first and look at the latter case in detail later.

The algorithm uses a point based technique to match the current observed scene to the stored or archived survey information, with the aim of bounding the drift inherent in dead reckoning techniques and reducing/eliminating the requirement to surface for GPS fixes. The technique operates in the following manner:

Salient points and features are first extracted from the sonar sensor data.

An affine transformation (see Appendix A) is then found which most closely matches the current scene to one of the areas in the survey database.

Having matched the scene to an area in the database the current vehicle state (x & y position, velocity and vehicle heading) is then updated and used to predict ahead to the state at the next sonar ping.

If a match cannot be found between the current scene and the database then the last reliable vehicle state is used to predict ahead to the next ping.

Texture boundaries from a classifier can be used to provide the points data sets which are used by the matching algorithm. This technique will work well in cases where the boundaries are repeatable and consistent. However, the classifier output can sometimes be a function of both the seabed type and the conditions under which the survey was carried out. For example, sand ripples may not appear in the sonar image under some conditions if they are insonified from the wrong direction and cannot therefore be recognised by the classifier. The technique may therefore be compromised if the scene is insonified from a different direction to the one in which the prior survey was carried out. Furthermore, boundary resolution as provided by a classifier can sometimes be poor if large sampling windows are necessary to provide the degree of discrimination required. For this reason, it may well be better to employ edge detectors to provide the point data sets for the registration algorithm.

An affine transformation consisting of both a translation and a rotation has been used. Scaling can be used but is of less importance within the context of sonar scene matching than either translation or rotation.

In order to derive the affine transformation which transforms one data set to the other, it is first necessary to specify the mapping between pairs of corresponding data points in both data sets. In doing this, a basis upon which to estimate the transformation parameters is derived. Unfortunately, contextual information which is necessary to relate points within a given data set is difficult to obtain and the problem is further compounded by the presence of noise between the data sets and the fact that the data sets do not, in general, contain the same number of points. A novel technique has therefore been developed to circumvent these problems and is described below.

An initial mapping is tentatively established between what are thought to be corresponding points in the two data sets. This is done on a nearest neighbour basis by mapping each point in the first data set to its nearest spatial neighbour in the second. Alternatively an optimal assignment algorithm (such as, for example, the Munkres or Hungarian algorithms) can be used to perform the assignment based on a Euclidean distance cost metric. The affine transformation parameters are then estimated, based on this tentative mapping, using the method of least squares or Iterative reweighted Least Squares. The affine transformation is then applied to each of the points in the first data set. The basic premise underlying the algorithm is that if a significant number of the initial assignments are correct, then the transformed data set might, reasonably, be expected to be closer to the second than it was to begin with. This being the case, it should then be possible to obtain an improved mapping between the points in the data sets and repeat the process in an iterative fashion until convergence is achieved. In practice a reverse assignment from the $2^{nd}$ to the $1^{st}$ data set is also performed in order to preserve symmetry and to try to prevent convergence to false minima.

Figure 1:
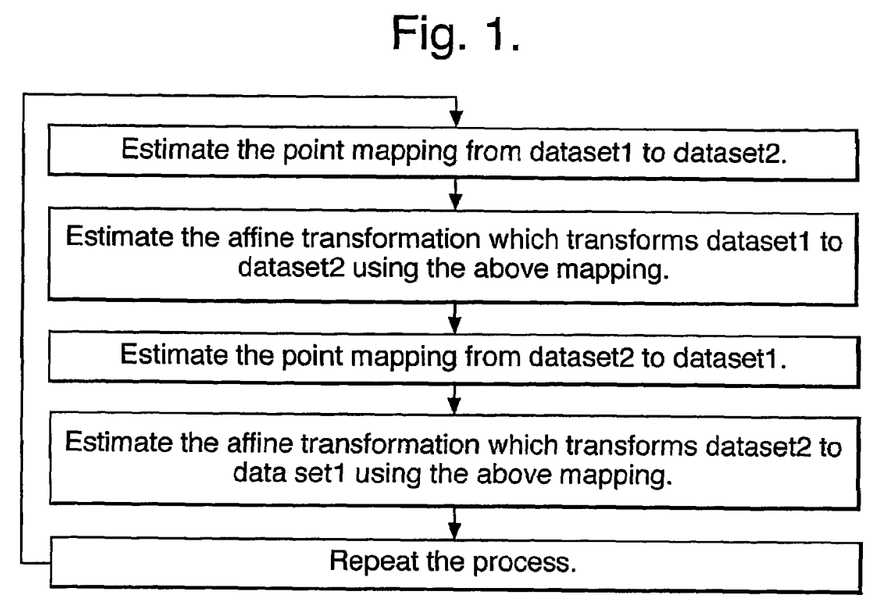
FIG. 1 shows a flow diagram schematically illustrating a data mapping process according to an embodiment of the invention.
Figure 2A:
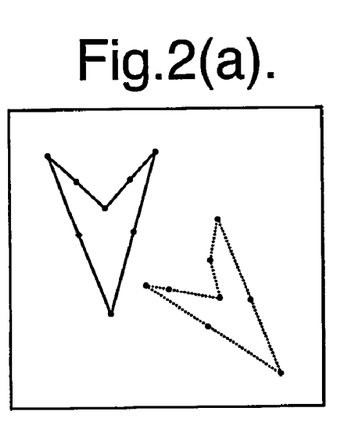
FIG. 2 shows an example of feature mapping between data sets.
Figure 2B:
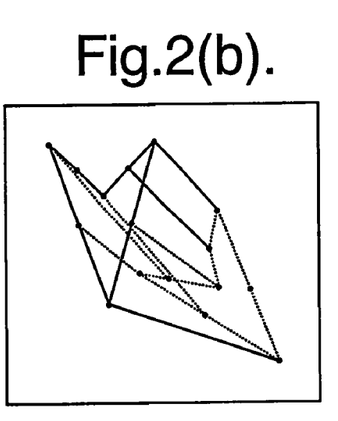
Figure 2C:
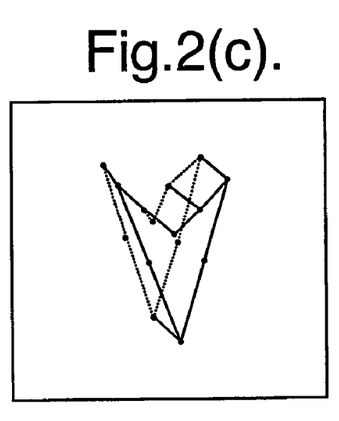
Figure 2D:
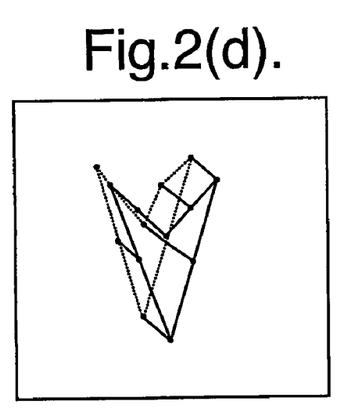
Figure 2E:
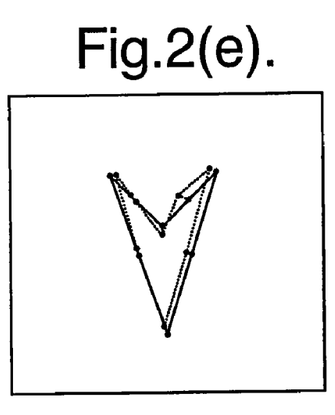
Figure 3:
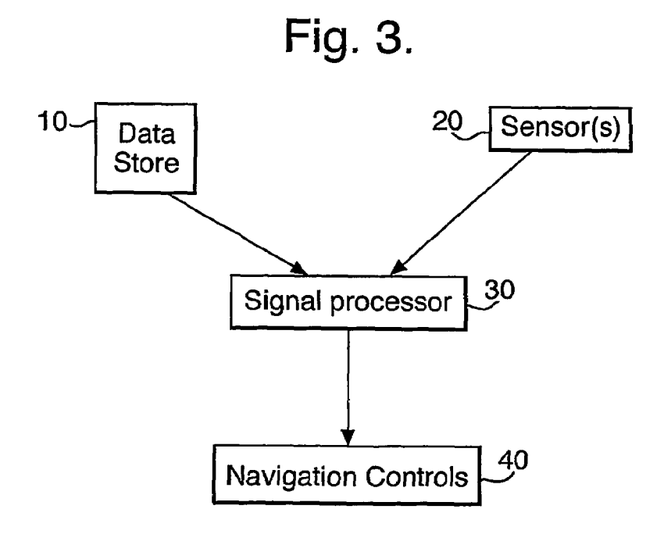
FIG. 3 shows a schematic example of a navigation system according to an embodiment of the present invention.

FIG. 1 shows a flow diagram giving a summary of the data mapping process according to an embodiment of the invention. Firstly the point mapping from dataset1 to dataset2 is estimated. Dataset1 may typically comprise map data of an area while dataset2 may be an image detected by a sensor on a vehicle moving through the area. The point mapping involves extracting a feature from the first data set and matching it with a feature in the second data set. Individual points making up the feature in dataset1 are then mapped to individual points in dataset2. Generally this is done on a nearest neighbour basis. Hundreds of points are used per feature as this reduces any error found if a particular point is mismatched. Using the plurality of individual mappings an affine transformation is then found which maps the detected feature with the corresponding feature on the survey database. The process is then repeated from dataset2 to dataset1 and a further affine transformation is calculated. The whole process is then repeated.

An example of this process using two V shaped sets of points is provided in FIG. 2. The reference data set is shown in full lines and the second data set in broken lines was obtained by rotating and translating the reference data set and then adding a spatial noise component to each point in the set. FIG. 2b shows the initial mapping from the $1^{st}$ to the $2^{nd}$ set of points. Correct associations are shown in full lines, incorrect in dotted lines. FIG. 2c shows the result of applying the affine transformation to the second data set based on this initial mapping (which contains 3 correct associations and 4 incorrect associations). As may be seen, the transformed set is much closer to the original even though 4 of the 7 assignments were incorrect. FIG. 2d shows the result of repeating the matching process. All of the points are now correctly matched. The final result is shown in FIG. 2e (where the differences due to the spatial noise component are now evident).

As outlined above, the success of the first estimation phase is dependent upon that of the second and vice versa. Any points that have been incorrectly matched during the first (mapping) phase will lead to errors in the second (parameter estimation) phase of the algorithm. However, experience has shown that provided enough points are initially matched correctly, the algorithm tends to establish lock very quickly and rapidly accelerates towards convergence.

In practice, some points from one data set may not necessarily correspond with any of those in the other. This may be due to the presence of noise, or it could also be due to genuine differences in the scenes (for example, the seabed texture may have changed slightly in the time period between the survey acquisition and UUV mission or objects such as fish may have been introduced into the scene). This can lead to the presence of statistical outliers in the squared distance distribution of the point pairs which can contaminate otherwise good estimates of the transformation parameters. One solution is to attempt to reject these statistical outliers by imposing an upper threshold on those squared distance values which are deemed to be unacceptable. This renders the technique more robust to the presence of statistical outliers.

One way of calculating a rudimentary threshold may be determined by choosing a multiple of the median of the squared distance distribution. The median was chosen in preference to the mean since as it is a more robust statistic. Alternatively more sophisticated techniques for outlier rejection can be employed.

If error ellipses are available for each of the points then this information can be incorporated into the distance metric which is used to minimise the difference between the fitted data sets. The error metric is no longer simply the mean squared distance between both sets of points but now reflects the positional uncertainty (in both the x and y directions) associated with each point. The displacement metric is a probabilistic function of both the relative positions between the points and their error ellipses. If the positional error is the same in both the x and y directions for all points then the error ellipse degenerates to a circle and the mean squared displacement error can be used as before. Thus, navigational uncertainty of individual points can be incorporated into the technique if it is available.

In tests the point at which convergence is achieved was found to be dependent upon the density of the points in the two data sets. In this initial simulation, convergence was determined by a threshold minimisation level, below which a solution was deemed to have been found. The optimal threshold was dependent on parameters such as point density, outlier level etc. A more robust method of identifying convergence would be to use the point at which the mean squared error of the fit stabilises at a minimum.

FIG. 4 schematically shows a navigation system according to an embodiment of the invention comprising a data store 10 for storing map data and at least one sensor 20 for detecting the environment external to the vehicle. These are connected to a signal processor 30 that calculates a data set transformation operable to map a first data set comprising data sensed by the sensor(s) onto a second data set being map data stored in the data store 10. This transformation data is then fed to navigation controls 40 that adjust the navigation controls of the vehicle in response to this calculated transformation.

The algorithm described can be used in such navigation systems in, for example, unmanned underwater vehicles to improve navigation, with the first data set being a map of the area and the second data set being the area as detected by sonar detectors on the unmanned underwater vehicle. Tests have shown that except in flat areas, bathymetric sonar detectors produced better results than FLS (forward look sonars) do. However, the best results were obtained when the two types of sensors worked in tandem.

In alternative embodiments the first data set could comprise data from a previous sonar ping, such that the progress of the vehicle could be plotted. In other embodiments the two systems could work together such that map data could be used where it was available and if it was not available data from a previous sonar ping could be used.

In environments where there is no map data available, there is still the potential to correct vehicle position by matching the sonar data to a previously recorded sonar map of the area of interest. In the following paragraphs we shall look at using changes between successive data sets to calculate vehicle motion in all six degrees of freedom, in a previously unmapped area, based on seabed imagery.

In particular, it has been found that visual based techniques, using an optical camera techniques are particularly effective. However, in environments where turbidity would restrict the vision of a camera then conventional 2D or 3D sonars could be used. Using the technique with a camera can be particularly effective in above water applications, for example in auto-pilot for a car, referencing against a coastline for a ship and for aircraft landing strip tracking.

In order for this technique to work it is important that features that can be mapped from one data set to another can be successfully extracted. Various feature extraction techniques can be used, these include edge detection, Hough transform evaluation, texture based feature extraction, and the use of second order derivative techniques.

Once suitable features have been identified, their movement must be tracked between image frames. This can be done using the feature mapping method of embodiments of the present invention.

A further embodiment of the invention can be used in synthetic aperture sonar (SAS). The purpose of SAS is to form a high resolution image by coherently integrating a series of pings, which are recorded as the sonar platform moves. In order for this to work an accurate integration path is required for coherent summation of the acoustic wavefronts. The technique of embodiments of the present invention can be used together with conventional forward look sonar data to improve the accuracy of the integration path. In order to perform this coherent integration, the position of the sonar must be known to within a small fraction of the sonar wavelength throughout the whole of the synthetic aperture length. The feature mapping technique of embodiments of the present invention can be used to enhance the position sensing of the sensors and as such increase the accuracy of the synthetic aperture sonar. This works particularly well where there is considerable overlap between consecutive pings, for example with side-looking sonar which typically gives several looks on the same area, the important requirement being multiple looks on the same patch of sea bed, so that features may be compared. The SAS data is processed at a low level and then this information is used to generate a high resolution image, this is in contrast to fusing images together at a higher level as is done with camera based applications.

Embodiments of the present invention can also be used in feature tracking algorithms which can be used to track objects going through a monitored system. Other embodiments of the present invention can be used to produce map data from images produced by a moving sensor, such as a camera mounted on a vehicle. It can also be used for quality control and inspection, for example, industrial inspection of objects moving on a conveyor belt. This technique could be used to track an object once an anomaly has been detected. It will also be appreciated that reference in the foregoing to mapping is not intended to be limited to the mapping of geographical or other physical data. The term is intended to encompass the mathematical sense namely a correspondence by which each element of a given set has associated with it one element of a second set. It is also intended to encompass the more general sense of a degree of correspondence between associated elements of different types or at different levels within process or scheme. Similarly, the reference to the term feature in the foregoing is not intended to be limited to topographical or physical features. Consequently, it may also be taken to refer to abstract features including those represented in visual and/or audio data sets.

Although a particular embodiment of the invention has been described herein, it will be apparent that the invention is not limited thereto and that many modifications and additions may be made within the scope of the invention. For example, various combinations of the features of the independent claims could be made with the features of the dependent claims without departing from the scope of the present invention.

The invention claimed is:

1. A method of deriving a feature tracking transformation to map at least one feature from a first data set onto a corresponding feature from a second data set, comprising the following steps:
   (a) extracting a first set of points relating to said at least one feature in said first data set;
   (b) associating said first set of points with a second set of points in said second data set;
   (c) calculating said feature tracking transformation to at least approximately map said first set of points from said first data set to said second set of points in said second data set, wherein said step of calculating said feature tracking transformation comprises the steps of:
   (i) for each point in one of said two sets of points, estimating a mapping of said point to a selected point in said other set of points to produce individual point mapping estimates;
   (ii) combining said individual point mapping estimates to produce an estimated transformation to map said one set of points to said other set of points;
   (iii) applying said estimated transformation to said one set of points to generate an approximate image position;
   (iv) repeating said steps (i) to (iii) iteratively to produce an estimated transformation for mapping said other set of points to a set of points from said approximate image position; and
   (v) deriving said feature tracking transformation for mapping said first set of points to said second set of points from a combination of said estimated transformations.

2. A method as claimed in claim 1, comprising the further steps of:
   iteratively repeating steps (i) to (iii) using said latest approximate image position and alternative first and second sets of points until said approximate image position aligns with said second set of points to within predetermined limits
   and deriving said feature tracking transformation from a combination of said estimated transformations.

3. A method as claimed in claim 2, wherein said steps (i) to (iii) are repeated iteratively until applying said estimated transformation to said approximate image produces no movement of said approximate image.

4. A method as claimed in claim 1, wherein step (i) the other points are selected on a nearest neighbour basis by mapping each point in said one set of points to its nearest spatial neighbour in said other set of points.

5. A method as claimed in claim 1, wherein step (i) of estimating the mapping of individual points is done using an optimal assignment algorithm.

6. A method as claimed in claim 1, wherein step (i) of estimating the mapping of individual points includes a deletion step during which any points from said data sets that are mapped over a distance that is greater than a specified distance are deleted from the set of points.

7. A method as claimed in claim 6, wherein said specified distance comprises a multiple number of times the median of the squared distance distribution of the distances between individual points in one set of points and their nearest neighbour in the other set of points.

8. A method as claimed in claim 1, wherein said step of deriving a feature tracking transformation comprises summing said mappings of said estimated transformations.

9. A method as claimed in claim 1, wherein step (a) of extracting said first set of points comprises using an edge detection algorithm to extract said points from said first data set.

10. A method as claimed in claim 1, where said at least one feature comprises bathymetric contours.

11. A method as claimed in claim 1, wherein said estimated transformation and said feature tracking transformation comprise affine transformations comprising a translation and a rotation of the sets of data points.

12. A method according to claim 11, further comprising the steps of:
   iteratively repeating steps (i) to (iii) using said latest approximate image position and alternative first and second sets of points until said approximate image position aligns with said second set of points to within predetermined limits
   and deriving said feature tracking transformation from a combination of said estimated transformations,
wherein said step (ii) to derive an estimated transformation to map said first set of points to said second set of points comprises combining the individual mappings using the method of least squares or iterative re-weighted least squares, and estimating said parameters of an affine transformation therefrom.

13. A method according to claim 1, wherein said first set of points comprises over one hundred points.

14. A method as claimed in claim 1 wherein sets of vectors having a position and a direction are extracted, associated and mapped rather than sets of points, a constraint being added to said method such that only vectors having similar directional components are mapped onto each other.

15. A method as claimed in claim 14, wherein said constraint comprises only allowing vectors from said first data set to mapped onto vectors from said second data set that have a directional component within +/−90° of said first data set vector.

16. A method of deriving a data set transformation for mapping a first data set onto a second data set, comprising a method as claimed in claim 1; and the further step of outputting said feature tracking transformation as a data set transformation for mapping said first data set to said second data set.

17. A method of deriving a data set transformation as claimed in claim 16, said method comprising a further step of extracting at least one further set of points or vectors relating to at least one further feature from said first data set;
   associating said at least one further set of points or vectors with a second further set of points or vectors in a second data set;
   calculating at least one further feature tracking transformation to at least approximately map said at least one further first set of points or vectors from said first data set to said further second set of points or vectors from said second data set, by using steps (i) to (v) of claim 1;
   combining said at least one feature tracking transformation and said further feature tracking transformation to produce a data set transformation; and
   outputting said data set transformation.

18. A method as claimed in claim 17, wherein said at least one feature comprises bathymetric contours of a certain depth and said at least one further feature comprises bathymetric contours of a different depth.

19. A method of enhanced navigation of a vehicle comprising deriving a data set transformation for mapping a first data set onto a second data set according to claim 16, wherein said first data set comprises stored map data of an area to be navigated through and said second data set comprises data detected by detectors on said vehicle during said navigation, said data set transformation being used to adjust navigation controls of said vehicle.

20. A method of enhanced navigation of a vehicle comprising deriving a data set transformation for mapping a first data set onto a second data set according to claim 16, wherein said first data set comprises data detected by detectors monitoring an area in front of said vehicle and said second data set comprises data detected by detectors monitoring an area beneath said vehicle during said navigation, said data set transformation being used to adjust navigation controls of said vehicle.

21. A method of enhanced navigation of a vehicle comprising deriving a data set transformation for mapping a first data set onto a second data set according to claim 16, wherein said first data set comprises both stored map data and where map data is not available data previously detected by detectors on said vehicle during navigation and said second data set comprises data currently detected by said detectors, said data set transformation being used to adjust navigation controls of said vehicle.

22. A method of enhanced navigation according to claim 19, wherein said detectors comprise sonar detectors and said vehicle is an unmanned underwater vehicle.

23. A method of enhanced navigation according to claim 22, wherein said data set transformation is used in conjunction with data from an inertial sensor to navigate said vehicle.

24. An image processing method for producing a map of an area from a plurality of images of said area produced by a sensor sensing said images as it moves relative to said area, said method comprising the following steps:
   deriving a data set transformation for mapping a first data set onto a second data set according to claim 16, wherein said first data set comprises an initial image of said area sensed by said sensor and said second data set comprises a subsequent image of said area sensed by said sensor after it has moved a certain distance; using said data set transformation to estimate said distance moved by said sensor relative to said area between images;
   combining said images using said estimated distance; and
   repeating said steps for subsequent images to produce a map of said area from said combined images.

25. A feature tracking method for tracking a feature as it moves relative to a sensor comprising a method of deriving a feature tracking transformation to map at least one feature from a first data set onto a corresponding feature from a second data set according to claim 1, wherein said first data set comprises an image sensed by said sensor and said second data set comprises a subsequent image sensed by said sensor, deriving a distance and direction moved by said feature from said feature tracking transformation.

26. A computer program product operable to control a computer to derive a feature tracking transformation to map at least one feature from a first data set onto a corresponding feature from a second data set by controlling said computer to perform the steps of a method according to claim 1.

27. A computer program product operable to control a computer to derive a data set transformation for mapping a first data set onto a second data set by controlling said computer to perform the steps of a method according to claim 16.

28. A device for deriving a feature tracking transformation to map at least one feature from a first data set onto a corresponding feature from a second data set comprising:
   a signal processor operable to extract a first set of points relating to at least one feature from said first data set and to match said first set of point to a second set of points in a second data set;

a calculating circuit operable to calculate a feature tracking transformation to at least approximately map said first set of points from said first data set to said second set of points in said second data set, wherein calculating circuit is operable to perform the following iteration:

for each point in one of said first or said second set of points, said circuit estimates a mapping of said point to a point in said other of said first or said second set of points;

combines said individual point mapping estimates to produce an estimated transformation to map said one set of points to said other set of points;

applies said estimated transformation to said one set of points to generate an approximate image position;

repeats said iterative steps to produce an estimated transformation for mapping said other set of points to a set of points from said approximate image position;

derives said feature tracking transformation for mapping said first set of points to said second points from a combination of said estimated transformations;

said device further comprising an output device for outputting said feature tracking transformation.

29. A device as claimed in claim 28, wherein sets of vectors having a position and a direction are extracted, matched and mapped rather than sets of points, said calculating circuit comprising a constraint such that only vectors having similar directional components are mapped onto each other.

30. A device as claimed in claim 29, wherein said constraint comprises only allowing vectors from said first data set to mapped onto vectors from said second data set that have a directional component within +/−90° of said first data set vector.

31. A navigation system for enhancing the navigation abilities of a vehicle comprising:

storage means operable to store map data;

at least one sensor for detecting said environment outside of said vehicle; and a signal processor comprising a computer program product according to claim 27 operable to calculate a data set transformation operable to map a first data set comprising said map data stored in said storage means onto a second data set comprising image data sensed by said at least one sensor; and navigation control means operable to control the navigation of said vehicle, said navigation control means being operable to respond to said calculated data set transformation.

32. A navigation system for enhancing the navigation abilities of a vehicle comprising:

storage means operable to store map data;

at least one sensor for detecting said environment outside of said vehicle; and a signal processor comprising a computer program product according to claim 27 operable to calculate a data set transformation operable to map a first data set comprising said map data stored in said storage means onto a second data set comprising image data sensed by said at least one sensor; and navigation control means operable to control the navigation of said vehicle, said navigation control means being operable to respond to said calculated data set transformation.

33. A navigation system for enhancing the navigation abilities of a vehicle comprising:

storage means operable to store map data;

at least one sensor for detecting said environment outside of said vehicle; and signal processor comprising a computer program product according to claim 27 operable to calculate a data set transformation operable to map a first data set comprising both stored map data and where map data is not available data previously detected by said sensors onto a second data set comprising image data currently sensed by said at least one sensor; and navigation control means operable to control the navigation of said vehicle, said navigation control means being operable to respond to said calculated data set transformation.

34. A navigation system for enhancing the navigation abilities of a vehicle comprising:

storage means operable to store map data;

at plurality of sensors for detecting said environment outside of said vehicle including an area in front of said vehicle and an area beneath said vehicle; and a signal processor comprising a computer program product according to claim 27 operable to calculate a data set transformation operable to map a first data set comprising data sensed by said sensors monitoring an area in front of said vehicle onto a second data set comprising data sensed by said sensors monitoring an area beneath said vehicle; and navigation control means operable to control the navigation of said vehicle, said navigation control means being operable to respond to said calculated data set transformation.

* * * * *